US012360475B2

(12) United States Patent
Shao et al.

(10) Patent No.: US 12,360,475 B2
(45) Date of Patent: Jul. 15, 2025

(54) TONER CARTRIDGE, METHOD FOR DETECTING REMAINING TONER AMOUNT, AND IMAGE-FORMING APPARATUS

(71) Applicant: Zhuhai Pantum Electronics Co., Ltd., Zhuhai (CN)

(72) Inventors: Zhe Shao, Zhuhai (CN); Aiguo Yin, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 18/172,299

(22) Filed: Feb. 21, 2023

(65) Prior Publication Data

US 2023/0205109 A1 Jun. 29, 2023

Related U.S. Application Data

(63) Continuation of application No. PCT/CN2021/114213, filed on Aug. 24, 2021.

(30) Foreign Application Priority Data

Aug. 28, 2020 (CN) ........................ 202010888189.8

(51) Int. Cl.
*G03G 15/08* (2006.01)

(52) U.S. Cl.
CPC ..... *G03G 15/0856* (2013.01); *G03G 15/0889* (2013.01)

(58) Field of Classification Search
USPC ........................................................... 399/61
See application file for complete search history.

(56) References Cited

U.S. PATENT DOCUMENTS 3,821,938 A * 7/1974 Bacon ................ G03G 15/0891 399/30
5,122,834 A * 6/1992 Okamoto ........... G03G 15/0822 399/63

(Continued)

FOREIGN PATENT DOCUMENTS

CN 1195792 A 10/1998
CN 1834807 A 9/2006

(Continued)

OTHER PUBLICATIONS

The World Intellectual Property Organization (WIPO) International Search Report for PCT/CN2021/114213 Nov. 2, 2021 5 Pages (including translation).

*Primary Examiner* — Quana Grainger
(74) *Attorney, Agent, or Firm* — ANOVA LAW GROUP PLLC

(57) ABSTRACT

The present disclosure provides a toner cartridge, a method for detecting a remaining toner amount, and an image-forming apparatus. The toner cartridge, installed on an image-forming apparatus, includes a toner hopper, configured to hold toner; a stirring unit, disposed in the toner hopper and configured to stir the toner in the toner hopper; and a detection unit, disposed on the stirring unit and configured to be in contact with the toner during a process of stirring the toner by the stirring unit and output a current signal. A housing of the toner cartridge is disposed with electrical connection contacts, and the detection unit is electrically connected to the image-forming apparatus through the electrical connection contacts. Whether the toner cartridge is short of toner before printed images are defective due to lack of toner is realized, and the detection process is relatively convenient with low detection cost.

15 Claims, 5 Drawing Sheets

(56) References Cited

U.S. PATENT DOCUMENTS

| | | | | | |
|---|---|---|---|---|---|
| 5,216,470 | A * | 6/1993 | Asanuma | G03G 15/0853 399/63 |
| 6,100,601 | A * | 8/2000 | Baker | G03G 15/0856 73/290 V |
| 2003/0016955 | A1 * | 1/2003 | Hiratsuka | G03G 15/08 399/27 |
| 2003/0123888 | A1 | 7/2003 | Naito et al. | |
| 2008/0267641 | A1 * | 10/2008 | Konishi | G03G 15/55 399/53 |
| 2014/0169810 | A1 * | 6/2014 | Leemhuis | G03G 15/0865 399/27 |
| 2016/0274492 | A1 | 9/2016 | Niijima | |
| 2019/0235413 | A1 | 8/2019 | Kanno | |

FOREIGN PATENT DOCUMENTS

| | | | | |
|---|---|---|---|---|
| CN | 101192030 | B | | 9/2010 |
| CN | 101422987 | B | | 5/2011 |
| CN | 103092046 | A | | 5/2013 |
| CN | 111399353 | A | | 7/2020 |
| CN | 111913375 | A | | 11/2020 |
| JP | H0519628 | A | | 1/1993 |
| JP | H07325473 | A | | 12/1995 |
| JP | 03233466 | B2 | * | 11/2001 |
| JP | 2005189557 | A | | 7/2005 |
| JP | 2008139883 | A | | 6/2008 |
| JP | 2012181424 | A | | 9/2012 |
| KR | 20070044858 | A | * | 5/2007 |
| WO | 2012144324 | A1 | | 10/2012 |

* cited by examiner

TONER CARTRIDGE, METHOD FOR DETECTING REMAINING TONER AMOUNT, AND IMAGE-FORMING APPARATUS

CROSS-REFERENCE TO RELATED APPLICATION

This application is a continuation of International Application No. PCT/CN2021/114213, filed on Aug. 24, 2021, which claims the priority to Chinese patent application No. 202010888189.8, filed on Aug. 28, 2020, the entirety of all of which is incorporated herein by their reference.

TECHNICAL FIELD

The present disclosure generally relates to the field of image-forming technology and, more particularly, relates to a toner cartridge, a method for detecting a remaining toner amount, and an image-forming apparatus.

BACKGROUND

Image-forming apparatuses are indispensable office equipment in daily use. Toner is a required material for laser printers to complete smooth printing.

In existing image-forming apparatus, toner is normally placed in the toner cartridge of the image-forming apparatus, and the user needs to remove the toner cartridge from the printer to check the remaining toner amount, which is inconvenient for the user. Moreover, when performing printing through the image-forming apparatus, the user often encounters the situation that the printing is paused due to insufficient toner and may only temporarily find the toner for adding, which may waste the user's time and even delay the user's printing progress to cause huge loss.

In particular, existing detection solutions of the toner in the toner cartridge may include optical toner detection, capacitive toner detection, and ultrasonic toner detection, which may be relatively expensive or have complex structures. Furthermore, another toner detection type, for example, magnetic signal toner detection, may be only suitable for magnetic toner detection. In addition, insufficient toner may be detected by measuring the SR (supply roller) current, but the disadvantage of such solution is that when the toner is detected to be insufficient, the images may already have defects, and the user may not be reminded in advance.

SUMMARY

One aspect of the present disclosure provides a toner cartridge. The toner cartridge is installed on an image-forming apparatus. The toner cartridge includes a toner hopper, configured to hold toner; a stirring unit, disposed in the toner hopper and configured to stir the toner in the toner hopper; and a detection unit, disposed on the stirring unit and configured to be in contact with the toner during a process of stirring the toner by the stirring unit and output a current signal. A housing of the toner cartridge is disposed with electrical connection contacts, and the detection unit is electrically connected to the image-forming apparatus through the electrical connection contacts.

Another aspect of the present disclosure provides an image-forming apparatus. The image-forming apparatus includes a toner cartridge installed on the image-forming apparatus, where a stirring unit is disposed in the toner cartridge; and a detection unit is disposed on the stirring unit and configured to be in contact with toner during a process of stirring the toner by the stirring unit and output a current signal; a controller, configured to control the stirring unit to rotate and drive the detection unit to rotate when the image forming device executes a printing task; and a current detection unit, electrically connected to the detection unit and the controller and configured to detect the current signal of the detection unit and output a current detection result to the controller, where the controller determines whether the toner cartridge is short of toner according to the current detection result.

Another aspect of the present disclosure provides a method for detecting a remaining toner amount, applied to an image-forming apparatus. A toner cartridge is installed on the image-forming apparatus; a stirring unit is disposed in the toner cartridge; the image-forming apparatus includes a controller; the image-forming apparatus or the toner cartridge includes a current detection unit; a detection unit is disposed on the stirring unit and configured to be in contact with toner during a process of stirring the toner by the stirring unit and output a current signal; and the current detection unit is electrically connected to the detection unit and the controller. The method includes when the image forming device executes a printing task, controlling, by the controller, the stirring unit to rotate and drive the detection unit to rotate; detecting, by the current detection unit, the current signal of the detection unit and outputting a current detection result to the controller; and determining, by the controller, whether the toner cartridge is short of toner according to the current detection result.

Other aspects of the present disclosure may be understood by those skilled in the art in light of the description, the claims, and the drawings of the present disclosure.

BRIEF DESCRIPTION OF THE DRAWINGS

To clearly describe the technical solutions of various embodiments of the present disclosure, the drawings which need to be used for describing various embodiments are described below. Obviously, the drawings in the following description are merely some embodiments of the present disclosure. For those skilled in the art, other drawings may be obtained in accordance with the drawings without creative efforts.

DETAILED DESCRIPTION

Figure 1:
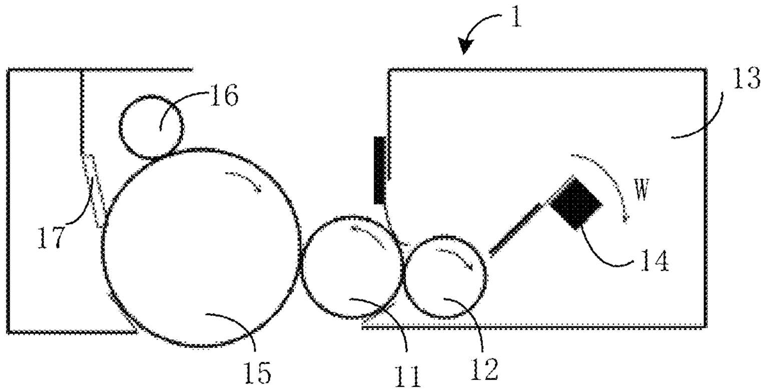
FIG. 1 illustrates a structural schematic of a toner cartridge provided by exemplary embodiments of the present disclosure.

To better understand technical solutions of the present disclosure, embodiments of the present disclosure are described in detail with reference to accompanying drawings.

It should be noted that described embodiments are only a part of embodiments of the present disclosure, rather than all embodiments. Based on embodiments of the present disclosure, all other embodiments obtained by those skilled in the art without creative work shall fall within the protection scope of the present disclosure.

In the present disclosure, "at least one" indicates one or more, and "a plurality of" indicates two or more. "And/or" describes the association relationship of associated objects, indicating that there can be three types of relationships. For example, A and/or B indicates that A exists alone, A and B exist at the same time, and B exists alone, where A and B may be singular or plural. The character "/" normally indicates that the contextual objects are an "or" relationship. "At least one of the following" or similar expressions indicate any combination of these items, including any combination of single or plural items. For example, at least one of a, b, or c may indicate that a, b, c, a-b, a-c, b-c or a-b-c, where a, b, c are singular or plural.

The image-forming apparatus is configured to perform image-forming jobs such as generating, printing, receiving and transmitting image data; and examples of the image-forming apparatus may include a printer, a scanner, a copier, a facsimile, and a Multi-Functional Peripheral (MFP) that performs above functions in a single device.

The image-forming apparatus may include a controller and an image-forming part. The controller may control the image data to be obtained by the image-forming part to form images on conveyed paper.

In some embodiments, the image-forming part may include an exposing assembly, a photosensitive drum (OPC, organic photoconductor), a charging roller, a developing roller, an intermediate transfer belt, a primary transfer roller, a secondary transfer roller, a fixing unit, a cleaning blade, and the like.

The image-forming process of the image-forming part may include charging the surface of the organic photoconductor by the charging roller, generating an exposure signal according to the image data by the exposing assembly, emitting a laser beam corresponding to the exposure signal, and exposing the surface of the organic photoconductor, thereby forming an electrostatic latent image on the surface of the organic photoconductor. Next, the developing roller develops the electrostatic latent image on the surface of the organic photoconductor into a toner image. Then, the primary transfer roller transfers the toner image on the surface of the organic photoconductor to the surface of the intermediate transfer belt for the first transfer, thereby forming the toner image on the surface of the intermediate transfer belt. The secondary transfer roller transfers the toner image on the surface of the intermediate transfer belt to paper for the second transfer. The paper on which the toner image is secondarily transferred is conveyed into a fixing unit. The fixing unit fixes the toner image on the paper to be discharged. In addition, the toner remaining on the surface of the organic photoconductor is removed by the cleaning blade.

If the image-forming apparatus has a color printing function, the number of the above-mentioned exposing assemblies, organic photoconductors, charging rollers, developing rollers and the like may be 4 or more.

The description of the toner cartridge in the present disclosure is described hereinafter.

FIG. 1 illustrates a structural schematic of a toner cartridge provided by exemplary embodiments of the present disclosure.

A toner cartridge 1 may be an integrated toner cartridge or a split toner cartridge. The integrated toner cartridge may integrate the toner cartridge 1 and the organic photoconductor on a same apparatus. When the toner is used up or the organic photoconductor is damaged, the toner cartridge and the organic photoconductor may be replaced together. For the split toner cartridge, the organic photoconductor and toner cartridge may be separated to be not attached. When the toner is used up, it may only need to replace old toner cartridge with new toner cartridge; and as long as the lifespan of the toner cartridge has not reached, the split toner cartridge may continue to use.

As shown in FIG. 1, in embodiments of the present disclosure, the toner cartridge 1 may include a developing roller (DR) 11, a supply roller (SR) 12, a toner hopper 13 and a stirring unit 14 disposed in the toner hopper 13.

If the integrated toner cartridge is used, the toner cartridge 1 may also include an organic photoconductor 15, a charging roller 16, and the like.

The toner hopper 13 may be configured to store the toner for developing. The toner hopper 13 may have a toner output outlet for outputting toner. The stirring unit 14 may be configured to stir the toner in the toner hopper 13. The toner in the toner hopper 13 may be outputted to the supply roller 12 through the toner output outlet by stirring. The supply roller 12 may be disposed at the toner output outlet and configured to transfer the toner outputted from the toner output outlet to the developing roller 11. When the developing roller 11 is applied with a developing bias voltage, the toner near the developing roller 11 may adhere to the region of the organic photoconductor 15 exposed by the exposing assembly, thereby developing the electrostatic latent image on the surface of the organic photoconductor 15 into the toner image.

In embodiments of the present disclosure, the toner cartridge 1 may further include structures such as a cleaning blade 17. The cleaning blade 17 may be disposed on the main body of the image-forming apparatus or in the toner cartridge 1.

Figure 2:
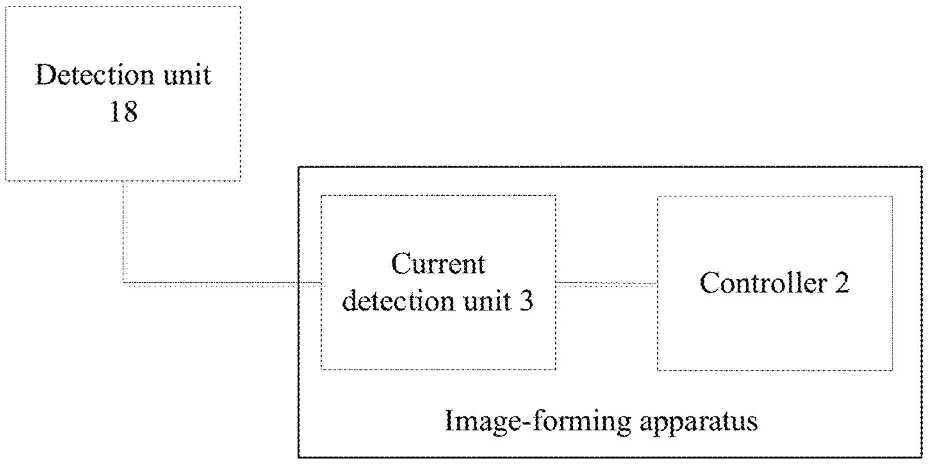
FIG. 2 illustrates a connection relationship schematic between a current detection unit and a detection unit provided by exemplary embodiments of the present disclosure.

FIG. 2 illustrates a connection relationship schematic between a current detection unit and a detection unit provided by exemplary embodiments of the present disclosure.

To solve the problems in existing technology, in embodiments of the present disclosure, the stirring unit 14 may be disposed with a detection unit 18. The detection unit 18 may be disposed on the stirring unit 14 and configured to be in contact with the toner during the process of stirring the toner by the stirring unit 14 and output a current signal.

The image-forming apparatus may include the controller; the image-forming apparatus or the toner cartridge 1 may include a current detection unit 3; and the current detection unit 3 may be electrically connected with the detection unit 18 and the controller 2. The current detection unit 3 may detect the current signal outputted by the detection unit 18 and output the current detection result to the controller 2, such that the controller 2 may determine whether the toner cartridge 1 is short of toner according to the current detection result. The housing of the toner cartridge 1 may be disposed with electrical connection contacts, and the detection unit 18 may be electrically connected with the image-forming apparatus through the electrical connection contacts.

Figure 3:
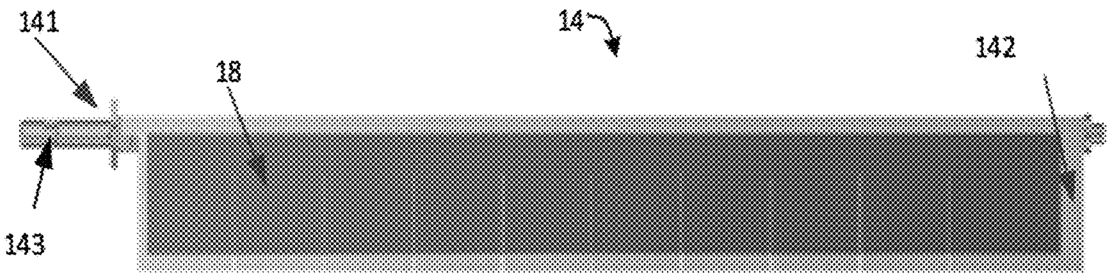
FIG. 3 illustrates a structural schematic of a stirring unit provided by exemplary embodiments of the present disclosure.

FIG. 3 illustrates a structural schematic of a stirring unit provided by exemplary embodiments of the present disclosure.

As shown in FIG. 3, as an implementation manner, the stirring unit 14 may include a stirring frame 141 and a stirring frame blade 142 disposed on the peripheral surface of the stirring frame 141. The stirring unit 14 may further include a stirring shaft 143, and the stirring shaft 143 may drive the stirring frame 141 to rotate, thereby driving the stirring frame blade 142 to rotate. It can be understood that the stirring frame blade 142 may be configured to have desirable stirring intensity to improve stirring quality.

The detection unit 18 may be configured to be in contact (e.g., having friction) with the toner to generate the current signal. For example, the detection unit 18 may stir and generate electricity by friction with the toner, and there may be no need for power supply to apply additional voltage to the toner. As such, current change released by the toner to the ground may be detected, thereby achieving passive detection effect.

As an implementation manner, the detection unit 18 may be a conductive material, such as a copper sheet. A single copper sheet may be configured for detection. The detection unit 18 may be attached to the stirring frame blade 142, which may be in desirable contact with the toner, thereby achieving desirable toner sensitivity. In other implementation manners, the detection unit 18 may also be a metal sheet having same or similar chemical properties as copper, for example, iron, aluminum or the like; or the detection unit 18 may also be an alloy which is made of copper combined with other metals, stainless steel or the like, which may not be limited according to embodiments of the present disclosure.

As an implementation manner, the stirring frame blade 142 of the stirring unit 14 itself may also be a conductive material; or a conductive coating may be on the surface of the stirring frame blade, which may be used as the electrical connection between the detection unit 18 and the current detection unit.

When the remaining toner amount needs to be detected, the controller 2 may control the stirring unit 14 to rotate under the driving source (not shown in drawings), for example, control the rotation of the stirring shaft 143 to drive the stirring frame 141 and the stirring frame blade 142. The stirring unit 14 may rotate along the W direction (clockwise) shown in FIG. 1.

Embodiments of the present disclosure provide a method for detecting the remaining toner amount. The method may be applied to the toner cartridge 1 and include following exemplary steps.

For example, the stirring unit may rotate to drive the detection unit to rotate; and the detection unit may be in contact with the toner in the toner cartridge to generate the current signal, such that the current detection unit may detect the current signal of the detection unit and output the current detection result to the controller, and the controller may determine whether the toner cartridge is short of toner according to the current detection result.

It can be understood that in embodiments of the present disclosure, the current detection unit may be disposed to detect the current signal of the detection unit which is disposed on the stirring unit and follows the rotation of the stirring unit, thereby determining whether the toner cartridge has toner or is short of toner according to the current detection result, which may have high detection accuracy and convenience, and have no need to manually open the toner cartridge to check. In addition, at this point, if it determines that the toner cartridge is short of toner, relatively large amount of toner may be still on the developing roller and supply roller, which may ensure that white streaks phenomenon may not occur within a certain number of pages. Therefore, it may determine whether the toner cartridge has toner or is short of toner before the toner in the toner cartridge is almost used up but there is no image defect, which may be convenient to remind the user to add toner or replace the toner cartridge in advance when printing errors (such as white streak phenomenon) occur. White streak phenomenon refers to the phenomenon that the image is abnormal when the toner is insufficient.

Figure 4:
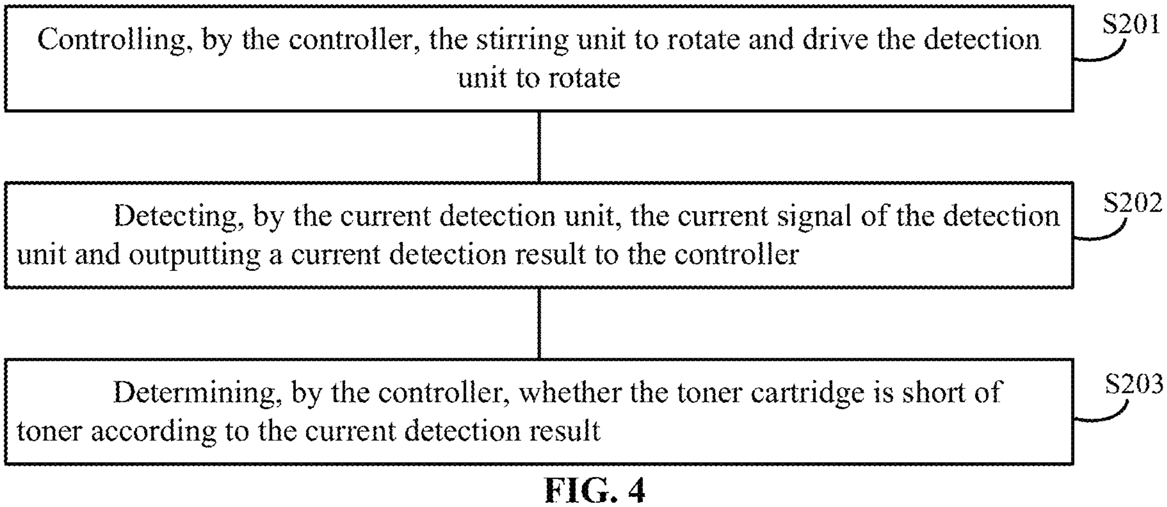
FIG. 4 illustrates a flowchart of a method for detecting a toner remaining amount provided by exemplary embodiments of the present disclosure.

FIG. 4 illustrates a flowchart of a method for detecting the toner remaining amount provided by exemplary embodiments of the present disclosure.

As shown in FIG. 4, the method for detecting the remaining toner amount provided by the present disclosure, applied to the image-forming apparatus, may include following exemplary steps.

At S201, the controller may control the stirring unit to rotate and drive the detection unit to rotate.

At S202, the current detection unit may detect the current signal of the detection unit and output the current detection result to the controller.

At S203, the controller may determine whether the toner cartridge is short of toner according to the current detection result.

Triggering the controller to detect the toner amount may be, but may not be limited, to any one or more of following cases: 1) The toner cartridge 1 is installed on the image-forming apparatus; 2) the image-forming apparatus is powered on or turned on; 3) before or after the print job is executed; 4) during the execution of the print task; and 5) receiving an instruction from the user to detect the remaining toner amount. The controller 2 of the image-forming apparatus may realize the detection of the remaining toner amount by rotating the stirring unit and driving the detecting unit to rotate.

As an implementation manner, if the toner cartridge 1 is short of toner, the controller 2 may prompt the user that current image-forming apparatus is in a state of lack of toner through the display unit (such as a display screen) and/or sound output unit (such as a speaker) of the image-forming apparatus, thereby reminding the user to add toner or replace the toner cartridge.

The current detection result outputted by the current detection unit 3 may be, for example, the current value of the detection unit 18. For example, the current detection unit 3 may be an nA (10-9A) or even a pA (10-12A) level current detection element with ultra-high sensitivity. In other implementation manners, the current detection unit 3 may also be disposed on the toner cartridge 1 or inside the controller 2.

As an implementation manner, the controller 2 may determine whether the toner cartridge 1 is short of toner according to the current detection result, which may include that during the rotation of the stirring unit 14, the current detection unit 3 may detect the current signal of the detection unit 18; and if it is detected that the absolute value of the current signal of the detection unit 18 is less than or equal to the first threshold for a duration exceeding the first preset time, or detected average current value of the detection unit 18 within the first preset time is less than or equal to the first threshold, it may determine the toner cartridge 1 is short of toner.

As an implementation manner, the controller 2 may determine whether the toner cartridge 1 is short of toner according to the current detection result, which may include that after the stirring unit 14 starts to rotate, if the change process of the current signal of the detection unit 18 is the first process, it may determine that the toner cartridge 1 is not short of toner, where the first process may be that the current signal of the detection unit 18 may be a gradually increasing positive current at first and may then gradually decrease to a negative current that absolute value of the negative current is greater than or equal to the second threshold.

As an implementation manner, the controller 2 may determine whether the toner cartridge 1 is short of toner according to the current detection result, which may include that during the rotation of the stirring unit 14, the current detection unit 3 may detect the current signal of the detection unit 18; and if it is detected that the absolute value of the current signal of the detection unit 18 is greater than or equal to the third threshold, it may determine that the toner cartridge 1 is not short of toner.

As an implementation manner, the controller 2 may also determine the remaining toner amount or the range of the remaining toner amount according to the current detected by the current detection unit 3. For example, when at a certain moment, the absolute value of the current signal of the detection unit 18 exceeds a certain preset value, it may indicate that the remaining toner amount is relatively large, for example, at least 70%.

The implementation principle of the present disclosure is described below by taking the detection of the remaining toner amount in the process of executing the printing task by the image-forming apparatus as an example.

Case 1: during the printing process of the image-forming apparatus, a certain amount of toner is in the toner hopper 13 continuously (that is, the toner cartridge 1 is not short of toner).

Figure 5:
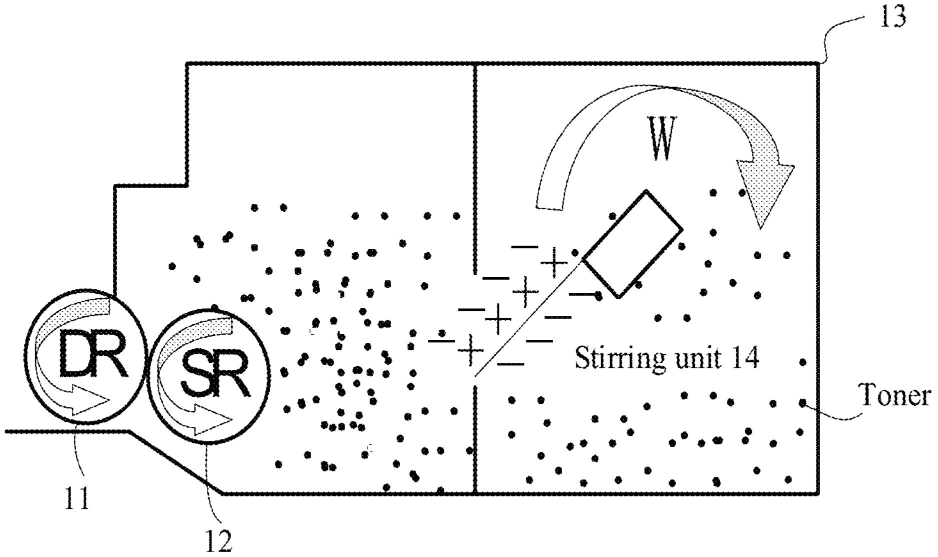
FIG. 5 illustrates another structural schematic of a toner cartridge provided by exemplary embodiments of the present disclosure.

As shown in FIG. 5, at the initial stage of the image-forming apparatus executing the printing task, if a certain amount of toner is in the toner hopper 13, during the rotation of the stirring unit 14, friction may be generated between the detection unit 18 (a copper sheet is used as an example for illustration below) and the toner in the toner hopper 13, and the toner in the toner hopper 13 may easily capture the electrons in the copper sheet, so that the copper sheet may be charged with a small amount of positive charges which may be accumulated, thereby generating a forward current to the current detection unit 3.

Figure 6:
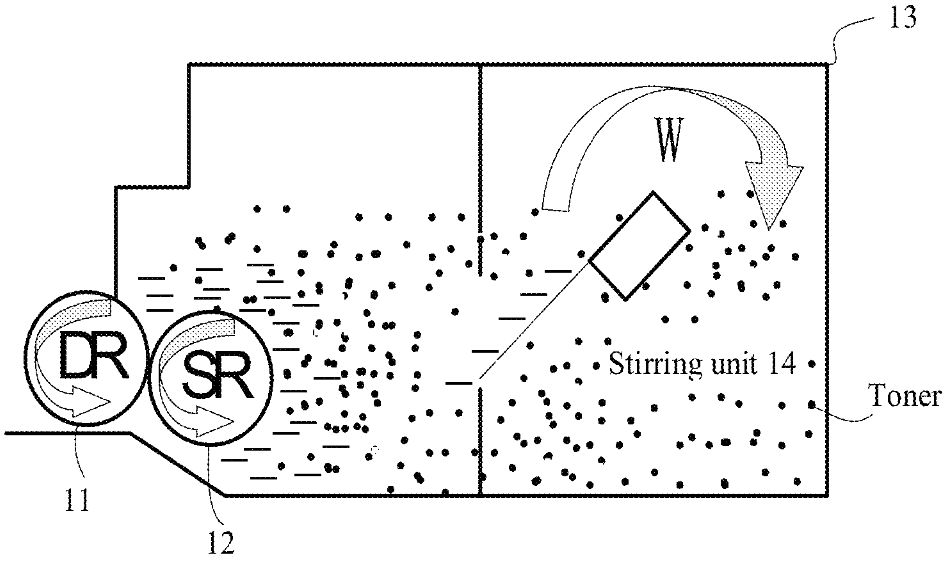
FIG. 6 illustrates another structural schematic of a toner cartridge provided by exemplary embodiments of the present disclosure.

As shown in FIG. 6, after the developing roller 11 rotates for a certain time, the undeveloped negatively charged toner on the developing roller 11 may return to the toner hopper 13, and the toner near the developing roller 11 and the supply roller 12 may be more negatively charged. When the stirring unit 14 rotates to the vicinity of the supply roller 12, the toner may conduct negative charges thereof to the copper sheet. At this point, negative charges may be accumulated on the copper sheet, so that the positive charges on the copper sheet may gradually decrease, and the negative charges may gradually increase, thereby generating a negative current to the current detection unit 3. Before the end of the printing task, if a certain amount of toner is in the toner hopper 13, the copper sheet may continuously output a negative current exceeding a certain value.

Figure 7:
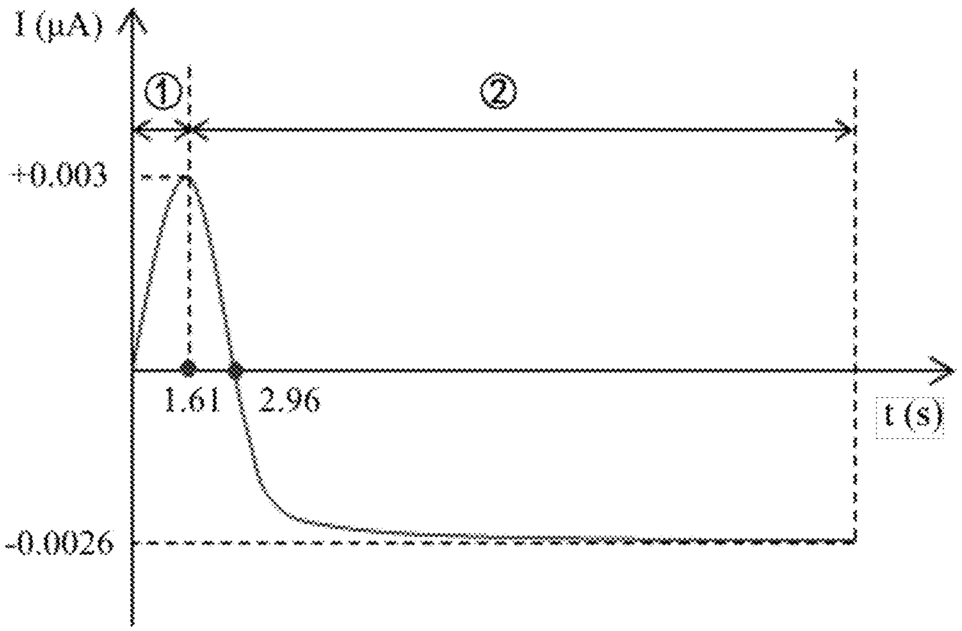
FIG. 7 illustrates a curve showing a current signal of a detection unit changing with time provided by exemplary embodiments of the present disclosure.

FIG. 7 illustrates a curve showing the current signal of the detection unit changing with time in the state that the toner cartridge is not short of toner.

For case 1, ① shown in FIG. 7 represents the time period corresponding to the initial stage of the image-forming apparatus executing the printing task, and ② shown in FIG. 7 represents the time period between after the developing roller 11 rotates for a certain time (for example, 1.61 seconds shown in FIG. 7) and the time that the printing task is finished.

As shown in FIG. 7, during the time period ①, the stirring unit 14 may rotate, friction may be generated between the detection unit 18 (such as the copper sheet) and the toner in the toner hopper 13, and the toner in the toner hopper 13 may capture the electrons in the copper sheet, causing the copper sheet to be charged with a small amount of positive charge which may be accumulated. Therefore, a forward current may be generated on the copper sheet, and the forward current may gradually increase. During the time period ②, after the developing roller 11 rotates for a certain time, the undeveloped negatively charged toner on the developing roller 11 may return to the toner hopper 13, the toner near the developing roller 11 and the supply roller 12 may be more negatively charged. When the stirring unit 14 rotates to the vicinity of the supply roller 12, the toner may conduct negative charges thereof to the copper sheet. At this point, negative charges may be accumulated on the copper sheet, so that the positive charges on the copper sheet may gradually decrease, and the negative charges may gradually increase; and the positive current outputted by the copper sheet may gradually decreases until the current becomes negative. Before the end of the printing task, if a certain amount of toner is in the toner hopper 13, the copper sheet may continuously output the negative current exceeding a certain value.

As disclosed above, after the stirring unit 14 starts to rotate, if the current detection unit 3 detects that the current signal of the detection unit 18 has a change process of "the current signal of the detection unit 18 may be a gradually increasing positive current at first and may then gradually decrease to a negative current that absolute value of the negative current is greater than or equal to the second threshold", the controller 2 may determine that current toner cartridge 1 is not short of toner. Or during the rotation of the stirring unit 14, if the current detection unit 3 detects that the absolute value of the current signal of the detection unit 18 is greater than or equal to the third threshold, the controller 2 may determine that current toner cartridge 1 is not short of toner. The second threshold and the third threshold may be, for example, 0.002 μA, 0.0025 μA or the like.

Case 2: in the process of executing the printing task by the image-forming apparatus, the toner hopper 13 changes from having a certain amount of toner (that is, the toner cartridge 1 is not short of toner) to being short of toner.

As shown in FIG. 5, at the initial stage of the image-forming apparatus executing the printing task, if a certain amount of toner is in the toner hopper 13, during the rotation of the stirring unit 14, friction may be generated between the copper sheet and the toner in the toner hopper 13, and the toner in the toner hopper 13 may easily capture the electrons in the copper sheet, so that the copper sheet may be charged with a small amount of positive charges which may be accumulated, thereby generating a forward current to the current detection unit 3.

As shown in FIG. 6, after the developing roller 11 rotates for a certain time, the undeveloped negatively charged toner on the developing roller 11 may return to the toner hopper 13, and the toner near the developing roller 11 and the supply roller 12 may be more negatively charged. When the stirring unit 14 rotates to the vicinity of the supply roller 12, the toner may conduct negative charges thereof to the copper sheet. At this point, negative charges may be accumulated on the copper sheet, so that the positive charges on the copper sheet may gradually decrease, and the negative charges may gradually increase, thereby generating a negative current to the current detection unit 3.

Figure 8:
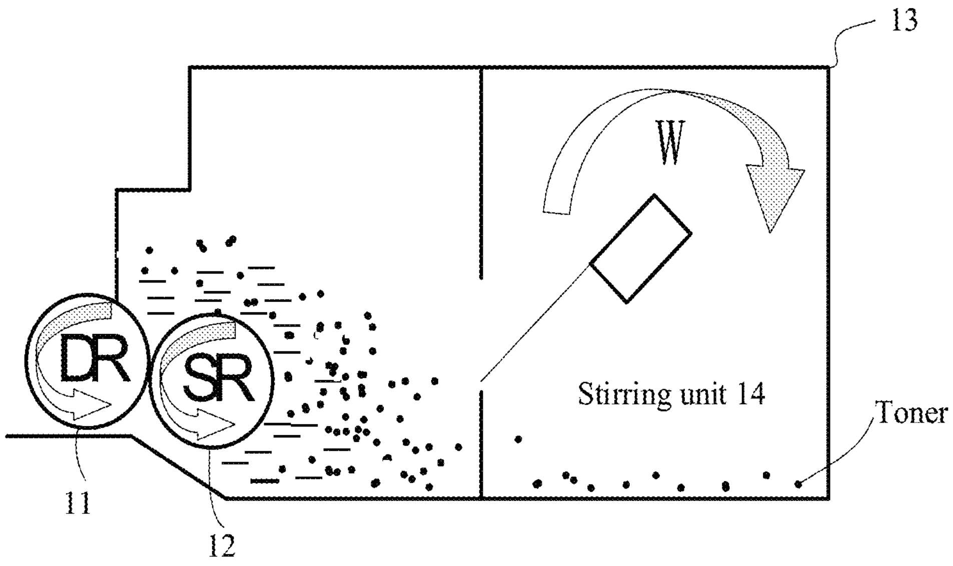
FIG. 8 illustrates another structural schematic of a toner cartridge provided by exemplary embodiments of the present disclosure.

As shown in FIG. 8, if the toner in the toner hopper 13 is gradually consumed until the toner cartridge is short of toner before the end of the printing task, the negatively charged toner in the vicinity of the supply roller 12 may be difficult to be in contact with the copper sheet. At this point, the negative charges on the copper sheet may gradually decrease until near zero, so that basically no charges flow on the copper sheet.

Figure 9:
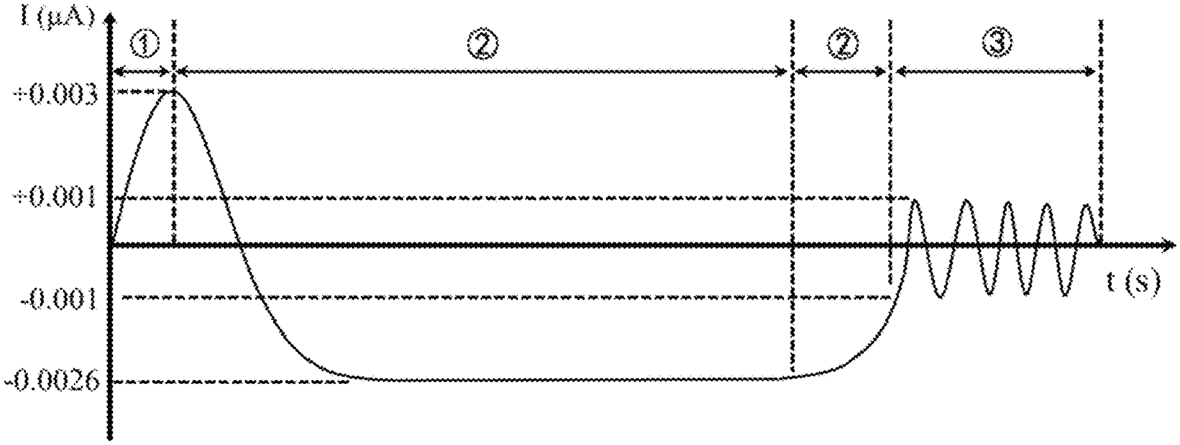
FIG. 9 illustrates another curve showing a current signal of a detection unit changing with time provided by exemplary embodiments of the present disclosure.

FIG. 9 illustrates another schematic curve showing the current signal of the detection unit changing with time when the toner cartridge 1 changes from the state of no toner shortage to the state of toner shortage during the execution of the printing task.

For case 1, ① shown in FIG. 9 represents the time period corresponding to the initial stage of the image-forming apparatus executing the printing task; ② shown in FIG. 9 represents the time period between after the developing roller 11 rotates for a certain time (for example, 1.61 seconds shown in FIG. 7) and the time that the printing task is short of toner; and ③ shown in FIG. 9 represents the time period corresponding to the state of toner shortage of the toner cartridge 1.

As shown in FIG. 9, during the time period ①, the stirring unit 14 may rotate, and friction may be generated between the detection unit 18 (such as the copper sheet) and the toner in the toner hopper 13, and the toner in the toner hopper 13 may capture the electrons in the copper sheet, causing the copper sheet to be charged with a small amount of positive charge which may be accumulated. Therefore, a forward current may be generated on the copper sheet and gradually increase. During the time period ②, after the developing roller 11 rotates for a certain time, undeveloped negatively charged toner on the developing roller 11 may return to the toner hopper 13, the toner near the developing roller 11 and the supply roller 12 may be more negatively charged. When the stirring unit 14 rotates to the vicinity of the supply roller 12, the toner may conduct negative charges thereof to the copper sheet. At this point, negative charges may be accumulated on the copper sheet, so that the positive charges on the copper sheet may gradually decrease, and the negative charges may gradually increase; and the positive current outputted by the copper sheet may gradually decrease until the current becomes negative. During the time period ③, the negative charges on the copper sheet may gradually decrease until near zero; and at this point, basically, no charges flow on the copper sheet.

As disclosed above, during the rotation of the stirring unit 14, if it is detected that the absolute value of the current signal of the detection unit 18 is less than or equal to the first threshold and the duration exceeds the first preset time, the controller 2 may determine that the toner cartridge 1 is short of toner. The first threshold may be, for example, 0.001 μA, 0.0015 μA or the like; and the first preset time may be, for example, 3 seconds, 4 seconds or the like.

Case 3: before the image-forming apparatus executes the printing task, the toner hopper 13 is already short of toner.

As shown in FIG. 8, if the toner hopper 13 is already short of toner before the printing task is executed, during the rotation of the stirring unit 14, no friction may be generated between the copper sheet and the toner in the toner hopper 13. At this point, basically, no charges flow on the copper sheet, so that the copper sheet may hardly generate current.

Figure 10:
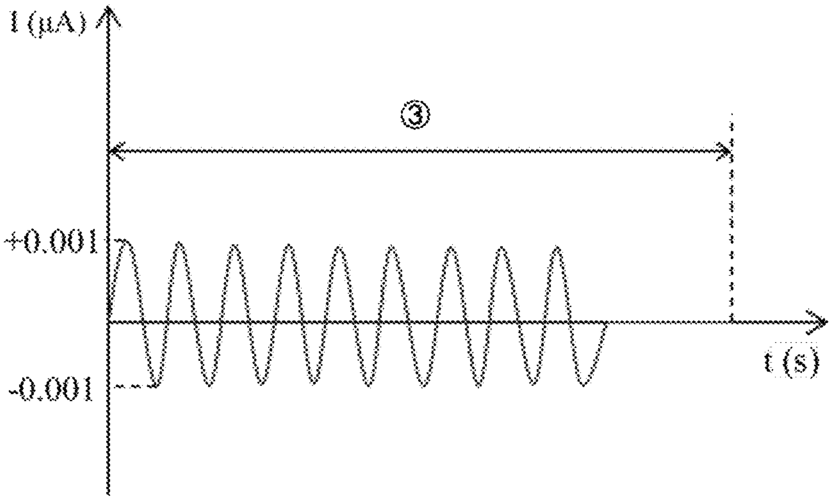
FIG. 10 illustrates another curve showing a current signal of a detection unit changing with time provided by exemplary embodiments of the present disclosure.

FIG. 10 illustrates another schematic curve showing the current signal of the detection unit 18 changing with time in the state that the toner cartridge is always short of toner.

③ shown in FIG. 10 represents the time period corresponding to the state that the toner cartridge 1 is short of toner.

As shown in FIG. 10, in the state that the toner cartridge is always short of toner, the change range of the current signal of the detection unit may be significantly small, and the current may be near 0.

As disclosed above, during the rotation of the stirring unit 14, if it is detected that the absolute value of the current signal of the detection unit 18 is less than or equal to the first threshold and the duration exceeds the first preset time, the controller 2 may determine that the toner cartridge 1 is short of toner. The first threshold may be, for example, 0.001 μA, 0.0015 μA or the like; and the first preset time may be, for example, 3 seconds, 3 seconds, 4 seconds or the like.

It can be understood that in embodiments of the present disclosure, the current detection unit may be disposed to detect the current signal of the detection unit which is disposed on the stirring unit and follows the rotation of the stirring unit, thereby determining whether the toner cartridge has toner or is short of toner according to the current detection result, which may have high detection accuracy and convenience. In addition, at this point, if it determines that the toner cartridge is short of toner, relatively large amount of toner may be still on the developing roller and supply roller, which may ensure that white streaks phenomenon may not occur within a certain number of pages. Therefore, it may determine whether the toner cartridge has toner or is short of toner before the toner in the toner cartridge is almost used up but there is no image defect, which may be convenient to remind the user to add toner or replace the toner cartridge in advance when printing errors (such as white streaks phenomenon) occur.

Referring to FIGS. 1-3, embodiments of the present disclosure also provide an image-forming apparatus. The image-forming apparatus may be disposed with the toner cartridge 1, where the stirring unit 14 may be disposed in the toner cartridge 1; and the image-forming apparatus or the toner cartridge 1 may also include the current detection unit 3.

The controller 2 may be configured to control the rotation of the stirring unit 14 and drive the detection unit 18 to rotate.

The current detection unit 3 may be electrically connected to the detection unit 18 and the controller 2 and configured to detect the current signal of the detection unit 18 and output the current detection result to the controller 2; and the controller 2 may also be configured to determine whether the toner cartridge 1 is short of toner according to the current detection result.

As an implementation manner, the detection unit 18 may be a conductive material, such as a copper sheet. The detection unit 18 may be attached to the stirring frame blade 142, which may be in desirable contact with the toner, thereby achieving desirable toner sensitivity. In other implementation manners, the detection unit 18 may also be a metal sheet having same or similar chemical properties as copper, for example, iron, aluminum or the like; or the detection unit 18 may also be an alloy which is made of copper combined with other metals, stainless steel or the like, which may not be limited according to embodiments of the present disclosure.

As an implementation manner, the stirring frame blade 142 of the stirring unit 14 itself may also be a conductive material; or a conductive coating may be on the surface of the stirring frame blade, which may be used as the electrical connection between the detection unit 18 and the current detection unit.

As an implementation manner, during the rotation of the stirring unit 14, the current detection unit 3 may detect the current signal of the detection unit 18; and if it is detected that the absolute value of the current signal of the detection unit 18 is less than or equal to the first threshold for a duration exceeding the first preset time, or detected average current value of the detection unit 18 within the first preset time is less than or equal to the first threshold, it may determine the toner cartridge 1 is short of toner.

In an optional implementation manner, after the stirring unit 14 starts to rotate, if the change process of the current signal of the detection unit 18 is the first process, it may determine that the toner cartridge 1 is not short of toner.

The first process may be that the current signal of the detection unit 18 may be a gradually increasing positive current at first and may then gradually decrease to a negative current that absolute value of the negative current is greater than or equal to the second threshold.

Those skilled in the art can clearly understand that for the convenience and conciseness of description, the working process and principle of the toner cartridge 1 and the image-forming apparatus described above may refer to corresponding description in above-mentioned method embodiments of the method for detecting the remaining toner amount, which may not be described in detail herein.

From above-mentioned embodiments, it can be seen that the solutions provided by the present disclosure may achieve at least following beneficial effects.

It can be understood that in embodiments of the present disclosure, the current detection unit may be disposed to detect the current signal of the detection unit which is disposed on the stirring unit and follows the rotation of the stirring unit, thereby determining whether the toner cartridge has toner or is short of toner, which may have high detection accuracy and convenience. In addition, at this point, if it determines that the toner cartridge is short of toner, relatively large amount of toner may be still on the developing roller and supply roller, which may ensure that toner shortage may not occur to case abnormal images within a certain number of pages. Therefore, it may determine whether the toner cartridge has toner or is short of toner before the toner in the toner cartridge is almost used up and there is no image defect, which may be convenient to remind the user to add toner or replace the toner cartridge in advance.

The above may merely be embodiments of the present disclosure. Changes or substitutions which may be easily thought by those skilled in the art within the technical scope disclosed by the present disclosure should be covered by the protection scope of the present disclosure. The protection scope of the present disclosure shall be subject to the protection scope of the claims.

What is claimed is:

1. A toner cartridge, installed on an image-forming apparatus, comprising:

a toner hopper, configured to hold toner;

a stirring unit, disposed in the toner hopper and configured to stir the toner in the toner hopper; and a detection unit, disposed on the stirring unit and configured to be in contact with the toner during a process of stirring the toner by the stirring unit to gain electric charge from or lose electric charge to the toner due to friction with the toner and output a current signal corresponding to the electric charge gained or lost, wherein:

a housing of the toner cartridge is disposed with electrical connection contacts, and the detection unit is electrically connected to the image-forming apparatus through the electrical connection contacts.

2. The toner cartridge according to claim 1, wherein:

the image-forming apparatus comprises a controller;

the image forming apparatus or the toner cartridge includes a current detection unit;

the current detection unit is electrically connected with the detection unit and the controller; and the current detection unit detects the current signal outputted by the detection unit and output a current detection result to the controller, such that the controller determines whether the toner cartridge is short of toner according to the current detection result.

3. The toner cartridge according to claim 1, wherein:

the stirring unit includes a stirring frame and a stirring frame blade which is disposed on a peripheral surface of the stirring frame; and the detection unit is disposed on the stirring frame blade.

4. The toner cartridge according to claim 3, wherein:

the detection unit is made of a conductive material and attached to the stirring frame blade; or the stirring frame blade itself is made of a conductive material.

5. The toner cartridge according to claim 4, wherein:

the detection unit is a single copper sheet.

6. The toner cartridge according to claim 1, wherein:

during the process of stirring the toner, current change is generated, released by the toner to ground, and the current signal is detected.

7. An image-forming apparatus, comprising:

a toner cartridge installed on the image-forming apparatus, wherein a stirring unit is disposed in the toner cartridge; and a detection unit is disposed on the stirring unit and configured to be in contact with toner during a process of stirring the toner by the stirring unit to gain electric charge from or lose electric charge to the toner due to friction with the toner and output a current signal corresponding to the electric charge gained or lost;

a controller, configured to control the stirring unit to rotate and drive the detection unit to rotate; and a current detection unit, electrically connected to the detection unit and the controller and configured to detect the current signal of the detection unit and output a current detection result to the controller, wherein the controller determines whether the toner cartridge is short of toner according to the current detection result.

8. The image-forming apparatus according to claim 7, wherein the controller is configured to:

during a rotating process of the stirring unit, if the current detection unit detects that an absolute value of a current signal of the detection unit is less than or equal to a first threshold for a duration exceeding a first preset time, determine that the toner cartridge is short of toner.

9. The image-forming apparatus according to claim 7, wherein the controller is configured to:

during a rotating process of the stirring unit, if the current detection unit detects that a change process of a current of the detection unit is a first process, determine that the toner cartridge is not short of toner, wherein:

the first process is that the current signal of the detection unit changes from a gradually increasing positive current to a gradually decreasing negative current wherein an absolute value of the negative current is greater than or equal to a second threshold.

10. A method for detecting a remaining toner amount, applied to an image-forming apparatus, wherein a toner cartridge is installed on the image-forming apparatus;

a stirring unit is disposed in the toner cartridge; the image-forming apparatus includes a controller; the image-forming apparatus or the toner cartridge includes a current detection unit; a detection unit is disposed on the stirring unit and configured to be in contact with toner during a process of stirring the toner by the stirring unit to gain electric charge from or lose electric charge to the toner due to friction with the toner and output a current signal corresponding to the electric charge gained or lost; and the current detection unit is electrically connected to the detection unit and the controller, the method comprising:

when the image-forming apparatus executes a printing task, controlling, by the controller, the stirring unit to rotate and drive the detection unit to rotate;

detecting, by the current detection unit, the current signal of the detection unit and outputting a current detection result to the controller; and determining, by the controller, whether the toner cartridge is short of toner according to the current detection result.

11. The method according to claim 10, wherein determining, by the controller, whether the toner cartridge is short of toner according to the current detection result includes:

during a rotating process of the stirring unit, if the current detection unit detects that an absolute value of the current signal of the detection unit is less than or equal to a first threshold for a duration exceeding a first preset time, determining, by the controller, that the toner cartridge is short of toner.

12. The method according to claim 10, wherein determining, by the controller, whether the toner cartridge is short of toner according to the current detection result includes:

during a rotating process of the stirring unit, if the current detection unit detects that a change process of the current signal of the detection unit is a first process, determining, by the controller, that the toner cartridge is not short of toner, wherein:

the first process is that the current signal of the detection unit changes from a gradually increasing positive current to a gradually decreasing negative current wherein an absolute value of the negative current is greater than or equal to a second threshold.

13. The method according to claim 10, wherein:

the stirring unit includes a stirring frame and a stirring frame blade which is disposed on a peripheral surface of the stirring frame; and the detection unit is disposed on the stirring frame blade.

14. The method according to claim 10, wherein:

the detection unit is made of a conductive material and attached to the stirring frame blade; or the stirring frame blade itself is made of a conductive material.

15. The method according to claim 14, wherein:

the detection unit is a single copper sheet.

* * * * *